United States Patent
Rohde et al.

(10) Patent No.: US 11,354,119 B2
(45) Date of Patent: Jun. 7, 2022

(54) AUTOMATICALLY UPGRADING AND FINDING COMPONENTS SIMILAR TO LEGACY VERSIONS

(71) Applicant: salesforce.com, inc., San Francisco, CA (US)

(72) Inventors: Sönke Rohde, San Francisco, CA (US); Brian J. Lonsdorf, Moss Beach, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 16/999,977

(22) Filed: Aug. 21, 2020

(65) Prior Publication Data
US 2020/0379754 A1 Dec. 3, 2020

Related U.S. Application Data

(63) Continuation of application No. 16/399,524, filed on Apr. 30, 2019.

(51) Int. Cl.
| | |
|---|---|
| G06F 9/44 | (2018.01) |
| G06F 8/71 | (2018.01) |
| G06K 9/46 | (2006.01) |
| G06F 8/65 | (2018.01) |
| G06F 16/958 | (2019.01) |
| G06F 16/957 | (2019.01) |

(52) U.S. Cl.
CPC .......... *G06F 8/71* (2013.01); *G06F 8/65* (2013.01); *G06F 16/957* (2019.01); *G06F 16/958* (2019.01); *G06K 9/4604* (2013.01)

(58) Field of Classification Search
CPC ........ G06F 8/71; G06F 16/958; G06F 16/957; G06F 8/65; G06K 9/4604
USPC .................................................. 717/100–107
See application file for complete search history.

(56) References Cited

U.S. PATENT DOCUMENTS

| | | | |
|---|---|---|---|
| 10,789,066 B1 | 9/2020 | Rohde et al. | |
| 2003/0233432 A1* | 12/2003 | Davis | H04L 41/0253 709/222 |
| 2004/0181543 A1 | 9/2004 | Wu et al. | |

\* cited by examiner

*Primary Examiner* — Chuck O Kendall
(74) *Attorney, Agent, or Firm* — Sterne, Kessler, Goldstein & Fox P.L.L.C.

(57) ABSTRACT

Disclosed herein are system, method, and computer program product embodiments for automatically upgrading and finding components similar to legacy versions. In an embodiment, an automatic upgrading system determines one or more properties of a first web part and identifies a first attribute for the one or more properties of the first web part. A second web part is identified by similar attribute as the first web part to create a web page by adding at least the second web part to the web page.

20 Claims, 6 Drawing Sheets

AUTOMATICALLY UPGRADING AND FINDING COMPONENTS SIMILAR TO LEGACY VERSIONS

CROSS-REFERENCE TO RELATED APPLICATIONS

This application is a continuation of U.S. application Ser. No. 16/399,524, titled "Automatically Upgrading And Finding Components Similar To Legacy Versions," filed on Apr. 30, 2019, which is incorporated herein by reference in its entirety.

BACKGROUND

A computing platform can have millions of components to provide various contents to its users and perform different functions. These components may include web pages, applications, or other underlying software, which may be created individually by developers with different visual appearance and functionality. The computing platform may be out of date after certain period of time and then it may need to be upgraded. While developers may be able to upgrade some components of the computing platform individually through manual work, upgrading millions of these components on the computing platform manually by developers may take too much time and effort to make it viable.

BRIEF DESCRIPTION OF THE DRAWINGS

The accompanying drawings are incorporated herein and form a part of the specification, illustrate the present embodiments and, together with the description, further serve to explain the principles of the present embodiments and to enable a person skilled in the relevant art(s) to make and use the present embodiments.

Figure 1:
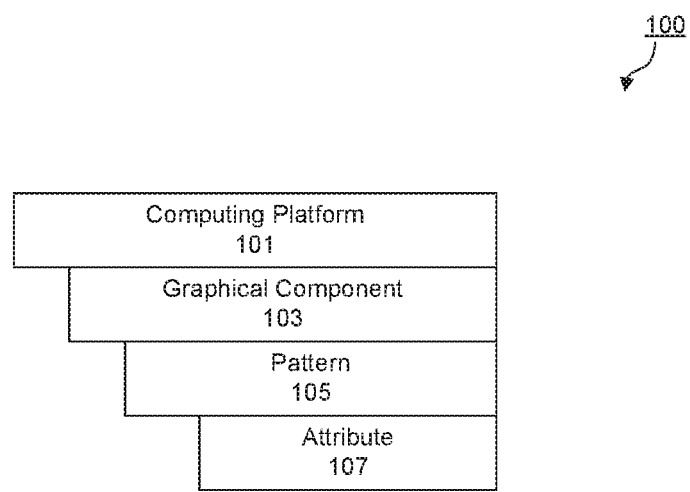
FIG. 1 illustrates a hierarchical relationship of elements on a computing platform, according to some embodiments.

The features and advantages of the present embodiments will become more apparent from the Detailed Description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

Provided herein are system, apparatus, device, method and/or computer program product embodiments, and/or combinations and sub-combinations thereof, for automatically upgrading and finding similar components to legacy versions.

Different components can be created on a computing platform by developers to present varieties of contents and perform various functions, and historically, when the computing platform is out of date, developers may need to get in each component and update the code, or upgrade with a similar component and maintain its functionality. Individual component may be manually upgraded in this way. However, developers may not be able to manually upgrade millions of components on a computing platform, and they may not be able to continually upgrade these components to prevent them from ever going out of date. Embodiments of the present disclosure, among other things, describe an apparatus, device, method and/or computer program product to automatically determine a pattern for a component of a computing platform, identify an attribute of the pattern, search for a new similar component based on the attribute, and replace the component with the new similar component. Automatically upgrading and finding similar components to a legacy version of a component may save significant amount of time and effort to upgrade millions of components on a computing platform. And it may also mitigate duplication errors and/or variations in manually upgrading these components.

FIG. 1 illustrates a hierarchical relationship of the elements on a computing platform, according to some embodiments. The following terms may be used to describe the elements in representative computing platforms:

Computing platform: an environment in which a piece of software is executed, such as a web browser and associated application programming interfaces (API), or a customer relationship management (CRM) system for managing company's relationships and interactions with customers and potential customers.

Graphical component: elements in a computing platform that has a visual appearance, for instance, different elements on a web page, like a piece of article, a message of comment, a dropdown menu.

Pattern: a representation of a graphical component, such as text, an icon, an image, a button, a link, or a label.

Attribute: a piece of information that determines the properties or contents of a pattern, including visual characteristic, data capacity, data type, context, etc.

In one example, a computing platform 101 may have a graphical component 103, and graphical component 103 may be represented by a pattern 105. Pattern 105 may have an attribute 107 to determine the property of pattern 105.

According to an exemplary embodiment, computing platform 101 may be a web browser, and graphical component 103 may be a comment message on a website of the web browser. Graphical component 103 may be broken down into a collection of patterns, including pattern 105 such as a text box. Pattern 105 of a text box may have multiple attributes, for instance, attribute 107 of data type for what data can be shown, or another attribute of data capacity for the size of data that pattern 105 may allow.

In some embodiments, computing platform 101, such as the web browser, may be out of date and need to be upgraded. And graphical component 103, for example, a comment message on the website of the old version web browser, may also need to be replaced with a new version of the graphical component. The pattern of the comment massage may be classified as a text box, and text box pattern may have an attribute of data type, for example text data. According to the attribute of the pattern, the text box may only allow text data but no image data. In replacing of graphical component 103, a new version of graphical component for comment message may be searched automatically in the new version of web browser based on the data type of the text box, e.g., text only and no image. As such, a new graphical component with an equivalent or similar pattern may be identified to replace graphical component 103.

Figure 2:
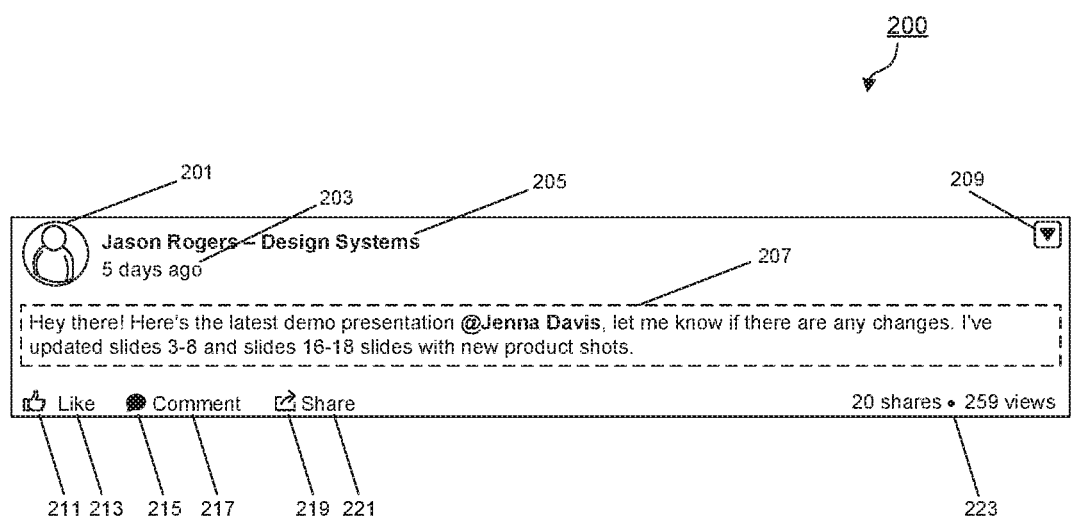
FIG. 2 illustrates an example component on a computing platform, according to some embodiments.

FIG. 2 illustrates an example component 200 on a computing platform, according to some embodiments. Component 200 may have several elements, for example, SRC image 201, account 205, and text box 207. The patterns for each element of component 200 may be classified and analyzed. And these patterns may have their own attribute. Elements of component 200 may be classified as a label, a link, text, an icon, an image, a button, and/or an input field. The attributes of the patterns may be identified, such as data capacity, data type, and visual characteristic. And the data type may be identified from the data shown up in component 200. According to some embodiments, the location of each pattern in component 200, the context of each pattern, and the nearest visual patterns adjacent to one pattern may be determined by out-of-the-box computer vision software.

In one exemplary embodiment, component 200 may be a message left on a website from one account. Three patterns of component 200 may be determined: SRC image 201, which specifies the uniform resource locator (URL) of the image, account 205, which has the account URL address for the person who leaves the message, and text box 207 displaying the text of the message. And the attributes of these patterns are identified for searching, for instance, the visual characteristic of SRC image 201, or data type of text box 207. The data type of text box 207 may be text data, and it may have data capacity of 1000 words. The visual characteristic of text box 200 may be flexible container-like box for text input, which could be adjusted based on the message content in it. And the flexible box layout may be determined based on a set of absolute positioned boxes nearby. With the upgrade of the platform, a new graphical component may be searched according to the attributes of the three determined patterns of component 200: SRC image 201, account 205 and text box 207. The new graphical component would have similar attributes of the patterns for graphical component 200, such as similar visual appearance for SRC image 201, same data type and data capacity for text box 207. The new component may replace component 200 on account of sharing similar patterns of SRC image, an account, and a text box.

According to some embodiments, image detection, classification of each pattern, and identification of nearest neighbors may be performed using a data structure, for example, k-dimensional tree (k-d tree) data structure. According to some embodiments, new component may be searched according to its visual similarity to the current version of the component. And identifying a visually similar component may be realized by neural network.

According to some embodiments, the data that represented by component 200 may also be represented by the new component. For instance, SRC image 201 in new component may specify the same URL as the URL in replaced component 200, and the message in text box 207 in new component may have the same content as the message in replaced component 200.

In some other embodiments, to replace every detail by a new version of component, all the elements of component 200 may be identified for the search of new component. For example, the icons of 211, 215, and 219, buttons of 213, 217, 221, and 209, as well as text boxes 203 and 223 may be determined in addition to the three patterns of SRC image 201, URL 205, and text box 207. The attribute of text box 203 may be identified as a string of text "5 days ago."

Figure 3:
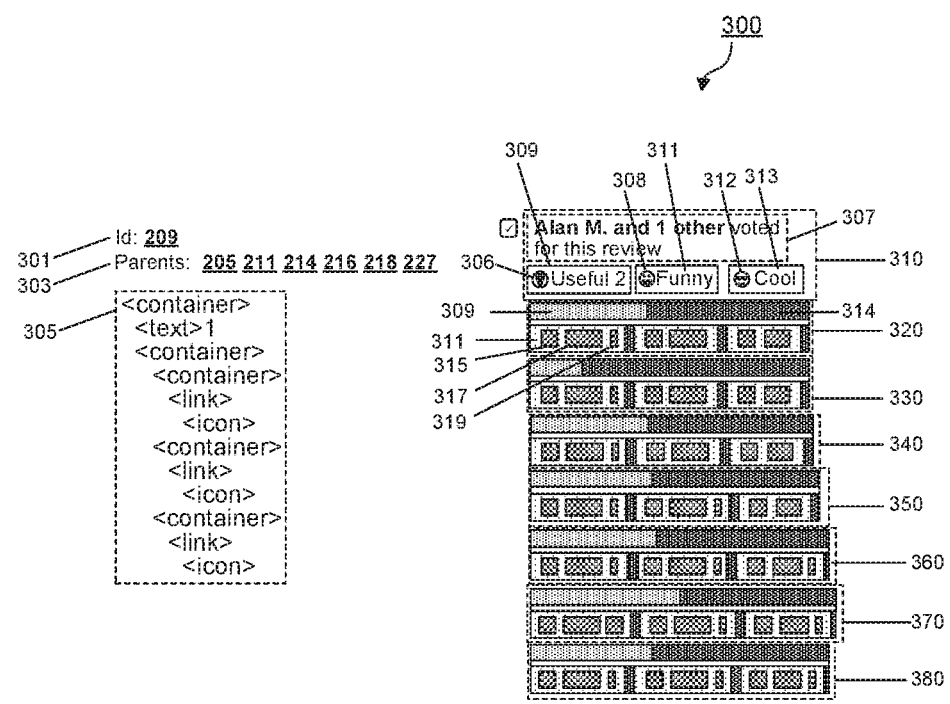
FIG. 3 illustrates an example of multiple variations for a pattern, according to some embodiments.

FIG. 3 illustrates an example 300 of multiple variations for a pattern, according to some embodiments. For example, component 310 may have several patterns: text 307 "Alan M. and 1 other voted for this review", and clickable buttons 309, 311 and 313. Each button may also have a label, an icon and a number indicating the times that the button has been clicked. In one example, button 309 may have an icon 306, a label "useful" and number "2". The number "2" may indicate that button 309 has been clicked twice as useful review, corresponding to the message that "Alan M. and 1 other voted for this review". Button 311 may have an icon 308 and a label "funny". There may be no numbers on button 311, indicating not clicked yet. Similarly, button 313 may have an icon 312 and a label "cool".

According to some embodiments, a pattern 320 may be determined to represent component 310. A container 314 may represent text 307 "Alan M. and 1 other voted for this review", with highlight "Alan M. and 1 other" represented by a container 309. These containers may be flexible box for text input, which could be adjusted based on the message content in it. For example, container 309 may become larger if longer text is highlighted. Another container 311 may represent button 309, with icon 306 represented by container 315, name of "useful" by container 317, and number "2" by container 319. Similarly, buttons 311 and 313 may also be represented by respective containers of pattern 320. Therefore, pattern 320 may represent every patterns of component 310. However, there may be small variations for component 310, such as different length of bolded text, or different number of clicks on button 309, 311 and 313. For example, bolded text of text 307 may be just "Alan", and there may be only 1 click on funny button 311. This variation may be captured by pattern 330. In another example, bolded text of text 307 may be "Alan M. and 5 other", and there may be 3 clicks on useful button 309, 1 click on funny button 311 and cool button 313. This variation may be captured by pattern 360. Patterns 330, 340, 350, 360, 370, and 380 may represent different variations of component 310. Instead of being determined as different patterns, these variations may be determined as a group of patterns similar to pattern 320. According to some embodiments, the variations between patterns 320, 330, 340, 350, 360, 370, and 380 may be captured, same containers may be grouped and abstracted into one pattern for different states of component 310. For example, the variations of patterns 320, 330, 340, 350, 360, 370, and 380 may be captured by a group pattern to represent different states of component 310.

In some embodiments, similar patterns may be grouped into one pattern using similarity metrics, such as jaccard similarity, which measures the size of the intersection divided by the size of union of the sample sets, or similarity metric 305, which is an abstract of the elements of a pattern. The group pattern may have a group ID and it may be a parent of the sub-patterns that are clustered by similarity metrics, for instance, jaccard similarity of these sub-patterns. According to some embodiments, patterns 320, 330, 340, 350, 360, 370, and 380 may be grouped into one group pattern with pattern ID 209. As such, group pattern 209 may be a parent of patterns 320, 330, 340, 350, 360, 370, and 380, and it may also have parents of group patterns 205, 211, 214, 216, 218, and 227. Automatically capturing different variations of patterns and grouping these patterns may mitigate the risk of duplication errors and/or variation in manually updating components in a computing platform.

Figure 4:
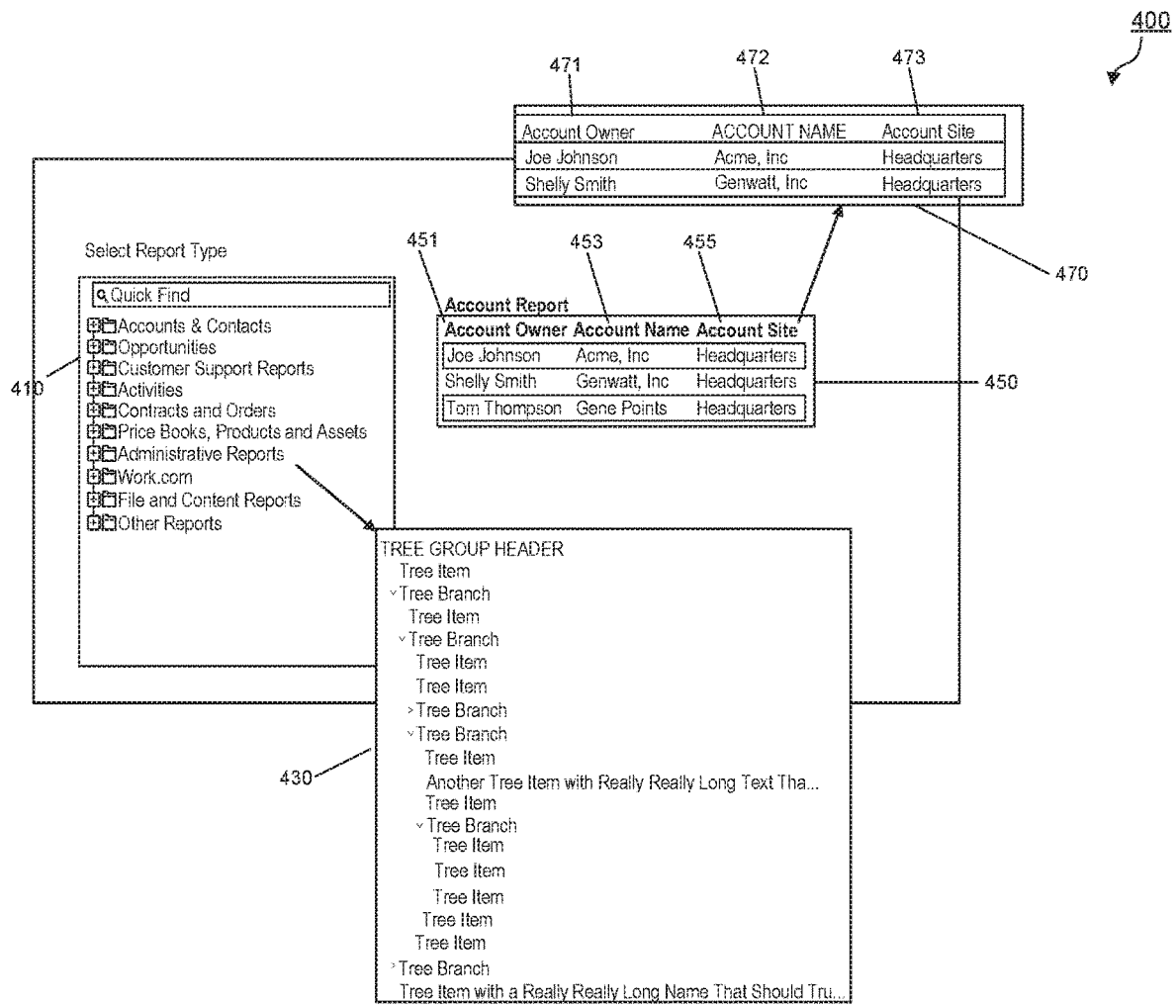
FIG. 4 illustrates examples of replacing different components, according to some embodiments.

FIG. 4 illustrates examples of replacing different components of a computing platform 400, according to some embodiments. In one example, computing platform 400 may have graphical components 410 and 450. Graphical component 410 may be a tree structure report having different fields, such as Accounts & Contacts, Opportunities, and Activities. These fields may be expandable and have subfields. For instance, Accounts & Contacts filed may include subfields of account owner, account name, and account site. Opportunities filed may have opportunity name, account name, close data, stage, confidence, amount, and contact. In the same vein, these subfields may have their subfields. By clicking on one field, a preview of its content may be demonstrated in a table format. For example, after clicking on Accounts & Contacts field, preview of the account report content 450 may be shown next to tree structure report 410.

According to some embodiments, the patterns of graphical components 410 and 450 may be determined for upgrading of platform 400. Then these patterns may be analyzed to identify their attributes, such as visual characteristic, data capacity, context, etc. A new graphical component may be searched for based on these attributes to replace previous component. And the new graphical component could represent the same data that previous graphical component represents.

For example, graphical component 410 may be determined to have a tree structure pattern with expandable fields and subfields. New graphical component 430 may be chosen to replace previous graphical component 410, based on what data is shown and how the data is shown in graphical component 410. Graphical component 430 may have visual similarity of a tree structure as graphical component 410, and it may have tree branches under the tree to replace the subfields of graphical component 410. Therefore, new graphical component 430 would have visual similarity to old graphical component 410, and would show the same data as old graphical component 410. In the same manner, graphical component 450 may be determined to have a data table pattern. New graphical component 470 may be a data table with visual similarity. In some embodiments, graphical component 470 may not only be able to represent the data for old graphical component 450, but also be able to represent the data for other fields of component 410, for example, opportunities. Opportunities and accounts & contacts have different number of subfields. New graphical component 470 may be flexible and have the capability of showing the data table needed for different fields of old graphical component 410.

In some embodiments, there may be several available patterns of new graphical component. These options could be presented for a user to choose. In some embodiments, new graphical component may not work well on a user's device that uses the new version computing platform. Previous graphical component may be automatically switched back to adapt to the user's device.

Figure 5:
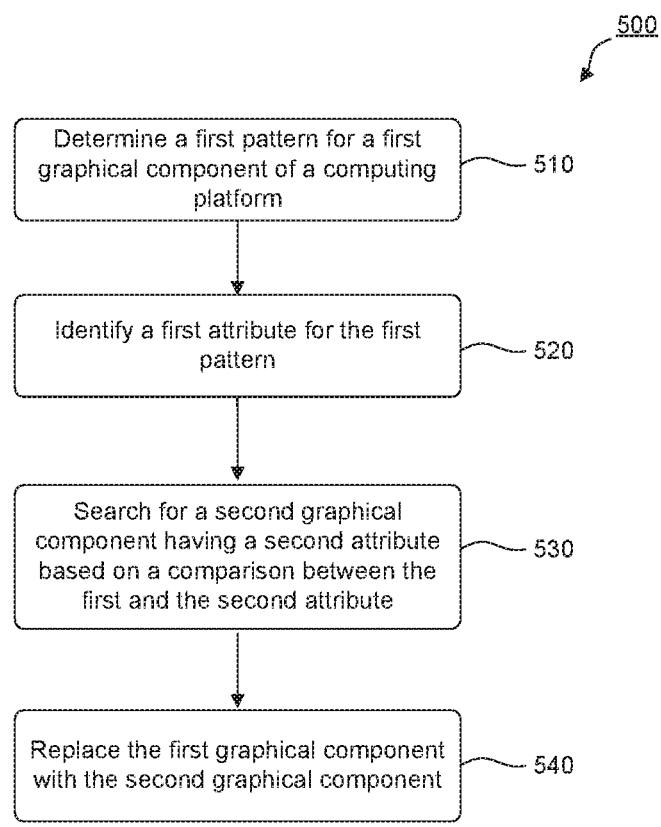
FIG. 5 illustrates a method demonstrating example operations to automatically find similar components and upgrade, according to some embodiments.

FIG. 5 illustrates a method 500 demonstrating example operations to automatically find similar components and upgrade them. Method 500 may be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art(s).

In 510, a first pattern for a first graphical component of a computing platform is determined. A pattern may be a label, link, text, icon, image, button, or input. Referring to FIG. 4, graphical component 410 may be analyzed and a pattern is determined, such as tree structure.

In 520, an attribute may be identified for the first pattern. Referring to FIG. 4, graphical component 410 may have a tree structure pattern. The attribute of the tree structure pattern may be identified, including data capacity, and visual characteristic. Tree structure pattern of component 410 may have multiple levels of fields and subfields. These fields may be expandable or collapsible. All these attributes may be all identified for graphical component 410.

In 530, a new graphical component having a similar attribute may be searched. Referring to FIG. 4, new graphical component 430 may be found and determined based on a similar visual characteristic. Graphical component 430 may be a tree structure with multiple tree branches to expend or collapse. It may be able to present the same data that presented by graphical component 410. According to some embodiments, a group of components with similar attribute may be provided to a user to choose for a new graphical component.

In 540, the old graphical component may be replaced by the new graphical component, which may be searched and determined by an attribute of the patterns of the graphical components. Referring to FIG. 4, new graphical components 430 and 470 may replace previous graphical components 410 and 450, respectively, based on their attributes, such as tree structure, data table. According to some embodiments, new graphical component may not work well on a user's device that uses the computing platform. Old graphical component may be automatically switched back to adapt to the user's device.

Figure 6:
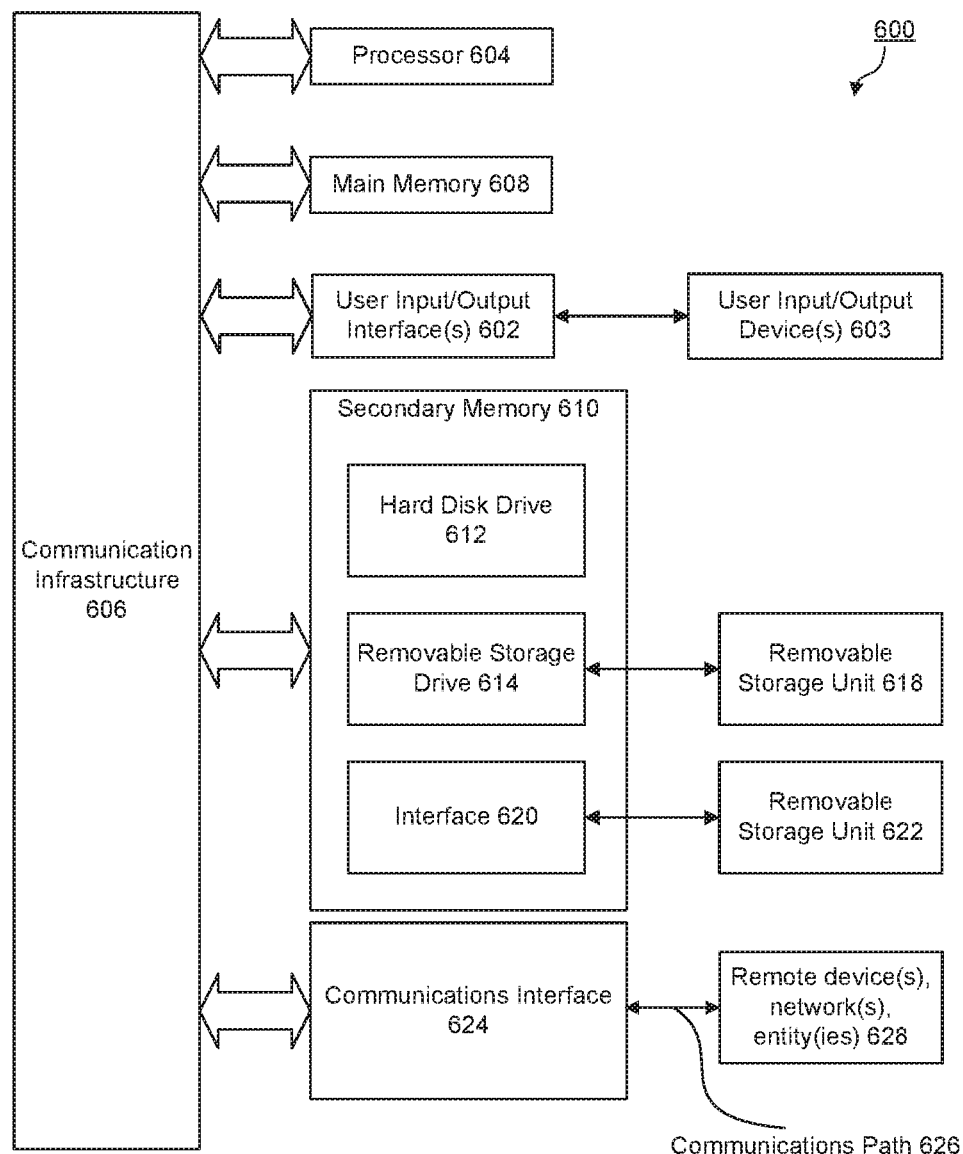
FIG. 6 is an example computer system useful for implementing various embodiments.

FIG. 6 is an example computer system useful for implementing various embodiments. Various embodiments may be implemented, for example, using one or more well-known computer systems, such as computer system 600 shown in FIG. 6. One or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 602, such as monitors, keyboards, pointing devices, etc., which may communicate with communication infrastructure or bus 606 through user input/output device(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/ any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method to automatically upgrade a first web part in a computing platform, comprising:
   determining, by a computing device, one or more properties of the first web part;
   identifying, by the computing device, a first attribute for the one or more properties of the first web part;
   identifying, by the computing device in response to an identification of the first attribute, a second web part with one or more properties having a second attribute based on a graphical similarity between the second attribute and the first attribute; and
   replacing, by the computing device in response to at least an identification of the second web part, at least the first web part in the computing platform with the second web part.

2. The method of claim 1, further comprising:
   rendering, by the computing device in response to replacing the at least the first web part with the second web part, a set of data previously rendered to the first web part onto the second web part.

3. The method of claim 1, wherein the second web part comprises a group of attributes corresponding to the first attribute based on the graphical similarity.

4. The method of claim 1, wherein identifying the second web part comprises:
   identifying the second web part with an image property having a visual characteristic corresponding to the first web part.

5. The method of claim 1, wherein identifying the second web part comprises:
   identifying the second web part with a table property having a data type corresponding to the first web part.

6. The method of claim 1, further comprising:
   switching, by the computing device, between the first web part and the second web part based on a requirement of a device, wherein the computing platform runs on the device.

7. The method of claim 1, further comprising:
   providing, by the computing device, a plurality of web parts to choose from for replacing the first web part.

8. A system to automatically upgrade a first web part in a computing platform, comprising:
   a memory; and
   at least one processor coupled to the memory and configured to:
   determine one or more properties of the first web part;
   identify a first attribute for the one or more properties of the first web part;
   identify a second web part with one or more properties having a second attribute based on a graphical similarity between the second attribute and the first attribute in response to an identification of the first attribute; and
   replace at least the first web part in the computing platform with the second web part in response to at least an identification of the second web part.

9. The system of claim 8, wherein the at least one processor is further configured to:
   render a set of data previously rendered to the first web part onto the second web part in response to replacing the at least the first web part with the second web part.

10. The system of claim 8, wherein the second web part comprises a group of attributes corresponding to the first attribute based on the graphical similarity.

11. The system of claim 8, wherein to identify the second web part, the at least one processor is configured to:
    identify the second web part with an image property having a visual characteristic corresponding to the first web part.

12. The system of claim 8, wherein the at least one processor is further configured to:
    switch between the first web part and the second web part based on a requirement of a device, wherein the computing platform runs on the device.

13. The system of claim 8, wherein the at least one processor is further configured to:
    provide a plurality of web parts to choose from for replacing the first web part.

14. A non-transitory computer-readable device having instructions stored thereon that, when executed by at least one computing device, cause the at least one computing device to perform operations to automatically upgrade a first web part in a computing platform, comprising:
    determining, by a computing device, one or more properties of the first web part;
    identifying, by the computing device, a first attribute for the one or more properties of the first web part;
    identifying, by the computing device in response to an identification of the first attribute, a second web part with one or more properties having a second attribute based on a graphical similarity between the second attribute and the first attribute; and
    replacing, by the computing device in response to at least an identification of the second web part, at least the first web part in the computing platform with the second web part.

15. The non-transitory computer-readable device of claim 14, the operations further comprising:
    rendering, by the computing device in response to replacing the at least the first web part with the second web part, a set of data previously rendered to the first web part onto the second web part.

16. The non-transitory computer-readable device of claim 14, wherein the second web part comprises a group of attributes corresponding to the first attribute based on the graphical similarity.

17. The non-transitory computer-readable device of claim 14, wherein identifying the second web part comprises:
    identifying the second web part with an image property having a visual characteristic corresponding to the first web part.

18. The non-transitory computer-readable device of claim 14, wherein identifying the second web part comprises:
    identifying the second web part with a table property having a data type corresponding to the first web part.

19. The non-transitory computer-readable device of claim 14, the operations further comprising:
    switching between the first web part and the second web part based on a requirement of a device, wherein the computing platform runs on the device.

20. The non-transitory computer-readable device of claim 14, the operations further comprising:

providing a plurality of web parts to choose from for replacing the first web part.

\* \* \* \* \*